(12) United States Patent
Hosler (10) Patent No.: US 9,392,679 B2
(45) Date of Patent: Jul. 12, 2016

(54) METHOD, APPARATUS AND SYSTEM FOR USING FREE-ELECTRON LASER COMPATIBLE EUV BEAM FOR SEMICONDUCTOR WAFER PROCESSING

(71) Applicant: GlobalFoundries Inc., Grand Cayman (KY)

(72) Inventor: Erik Robert Hosler, Cohoes, NY (US)

(73) Assignee: GlobalFoundries Inc., Grand Cayman (KY)

( * ) Notice: Subject to any disclaimer, the term of this patent is extended or adjusted under 35 U.S.C. 154(b) by 0 days.

(21) Appl. No.: 14/562,570

(22) Filed: Dec. 5, 2014

(65) Prior Publication Data

US 2016/0165710 A1    Jun. 9, 2016

(51) Int. Cl.
| | |
|---|---|
| H01S 3/23 | (2006.01) |
| H05G 2/00 | (2006.01) |
| H01S 3/09 | (2006.01) |
| H01S 3/00 | (2006.01) |
| H01S 3/04 | (2006.01) |

(52) U.S. Cl.
CPC .............. *H05G 2/008* (2013.01); *H01S 3/0071* (2013.01); *H01S 3/0407* (2013.01); *H01S 3/0903* (2013.01); *H01S 3/23* (2013.01)

(58) Field of Classification Search
None
See application file for complete search history.

(56) References Cited

U.S. PATENT DOCUMENTS

| | | | | |
|---|---|---|---|---|
| 4,189,686 A * | 2/1980 | Brau | .................... | H01S 3/09707 372/2 |
| 4,455,277 A * | 6/1984 | Schlitt | ...................... | G21B 1/23 372/2 |
| 9,161,426 B2 * | 10/2015 | Patra | ................... | G06F 7/70008 |
| 2005/0175042 A1 * | 8/2005 | Hajima | ................... | H01S 3/102 372/2 |
| 2005/0205811 A1 * | 9/2005 | Partlo | ..................... | B82Y 10/00 250/504 R |
| 2009/0314949 A1 * | 12/2009 | Plettner | ..................... | H05H 7/06 250/397 |
| 2011/0205517 A1 * | 8/2011 | Tegenbosch | ........ | G06F 7/70175 355/67 |
| 2014/0077099 A1 * | 3/2014 | Hori | ....................... | H05G 2/008 250/458.1 |
| 2014/0239805 A1 * | 8/2014 | Plettner | .................... | G21K 5/04 315/9 |
| 2015/0076359 A1 * | 3/2015 | Bykanov | ................ | H05G 2/008 250/372 |

FOREIGN PATENT DOCUMENTS

| | | | | |
|---|---|---|---|---|
| DE | 102013211830 A1 * | 6/2014 | .............. | H05H 7/04 |
| NL | WO 2015082295 A1 * | 6/2015 | ............ | H01S 3/0903 |
| RU | 1809934 A3 * | 4/1993 | .............. | H01J 25/00 |

OTHER PUBLICATIONS

Freund et al. "Multiple-beam free-electron lasers", Nuclear Instruments and methods in Physics Research A 507 (2003).*

* cited by examiner

*Primary Examiner* — Michael Logie
(74) *Attorney, Agent, or Firm* — William Morgan, P.C.

(57) ABSTRACT

At least one method, apparatus and system for providing an extreme ultraviolet beam for processing semiconductor wafers are disclosed. A level of the EUV beam is monitored. A determination is made as to whether the level of the EUV beam is below a predetermined level. In response to determining that the level of the EUV beam is below the predetermined level, a determination is made as to whether the output of at least one of the first or second laser devices has decreased from an initial level. The output of the at least one of the first or second laser devices is increased in response to determining that the output of at least one of the first or second laser devices has decreased from an initial level.

7 Claims, 10 Drawing Sheets

FIGURE 1

(Prior Art)

FIGURE 2

(Prior Art)

METHOD, APPARATUS AND SYSTEM FOR USING FREE-ELECTRON LASER COMPATIBLE EUV BEAM FOR SEMICONDUCTOR WAFER PROCESSING

FIELD OF THE INVENTION

Generally, the present disclosure relates to providing optics for the manufacture of sophisticated semiconductor devices using, and, more specifically, to various methods and structures for using free-electron laser compatible EUV beam combiner for semiconductor wafer processing.

DESCRIPTION OF THE RELATED ART

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, photolithography, or the like), to the packaging and final testing of the completed device, are so different from one another and specialized that the processes may be performed in different manufacturing locations that contain different control schemes.

Generally, a set of processing steps is performed on a group of semiconductor wafers, sometimes referred to as a lot, using semiconductor-manufacturing tools, such as an exposure tool or a stepper/scanner. Photolithography processes are an important part of forming geometric patterns on a semiconductor wafer. Often ultraviolet (UV) light sources are used to create geometric patterns on a photoresist layer on a semiconductor substrate. State of the art photolithography processes include using argon-fluoride lasers to generate UV light for generating patterns on the substrate.

Light sources providing sufficient power in the EUV are required to shrink the wavelength of light currently used in photolithography. Currently available lasers, e.g., argon-fluoride lasers, having sufficient power for HVM generally lack a natural active lasing medium to produce EUV light. As a result, designers have used micron scale tin (Sn) droplets that are super-radiated with a $CO_2$ laser at high (kilowatt) power. This generates highly-charged tin particles that may be used to as an active lasing medium to produce HVM compatible EUV lasers via a process known as laser-produced plasma (LPP). However, the state of the art lacks an efficient means for producing HVM compatible EUV power for semiconductor manufacturing.

Figure 1:
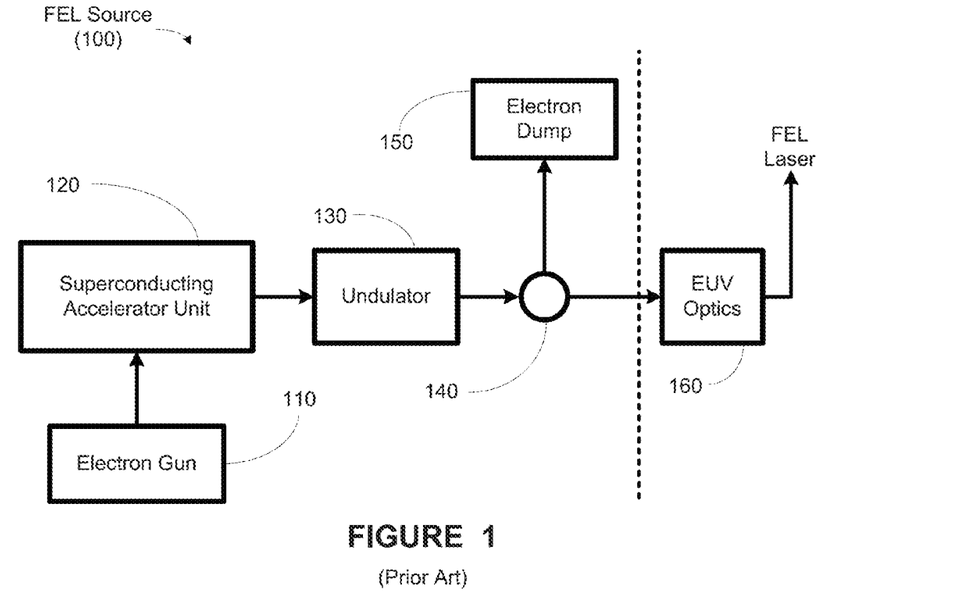
FIG. 1 illustrates a stylized depiction of a typical FEL source.
Figure 2:
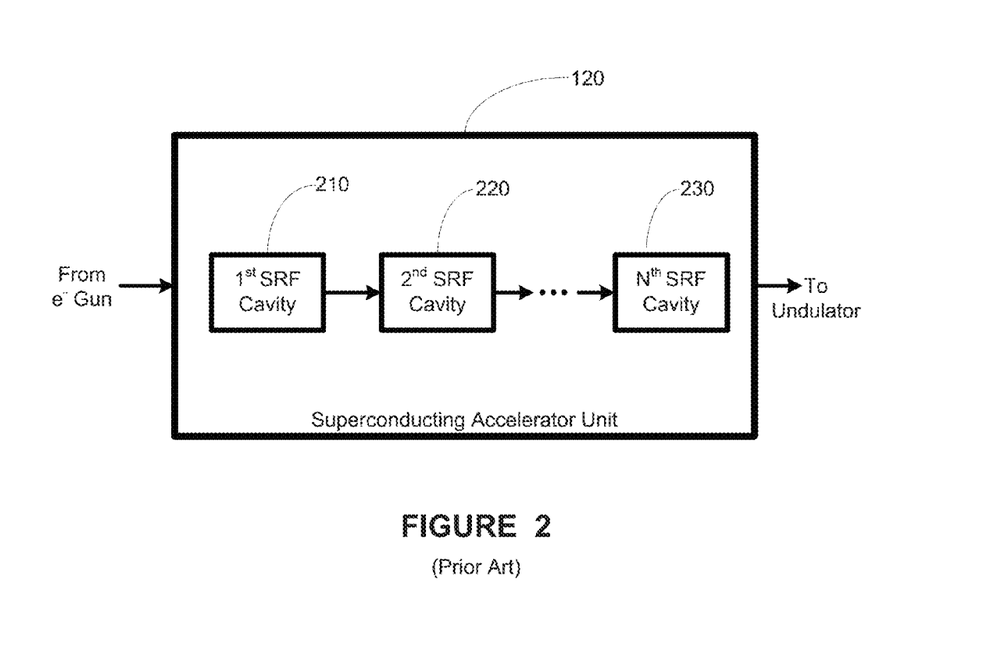
FIG. 2 illustrates a stylized depiction prior art superconducting accelerator of the FEL source of FIG. 1.

Designers have suggested a single source, high-power free electron laser (FEL) for use in photolithography processes in semiconductor wafer processing. FIG. 1 illustrates a typical FEL source. FIG. 2 illustrates a typical superconducting accelerator of FIG. 1. Referring simultaneously to FIGS. 1 and 2, an electron gun 110 comprises an electron source and an electron injector. The electron gun 110 defines various parameters of the generated electron bunches. The electron bunches are sent through a superconducting accelerator unit 120. As shown in FIG. 2, the superconducting accelerator unit 120 contains a $1^{st}$ through $N^{th}$ superconducting radio frequency (SRF) cavities 210-230. The series of SRF cavities 210-230 accelerate the electron bunches to relativistic velocities.

Upon accelerating the electron bunches to relativistic velocities, the electron bunches are sent to an undulator 130. The undulator 130 comprises a plurality of strategically positioned magnets of alternating polarity. The undulator 130 comprises an undulator period and magnetic strength parameters for a particular electron beam energy. The undulator 130 is used to oscillate the electron bunches to generate radiation that is proportional to the undulator period, undulator magnetic strength, and the electron beam energy provided by the ERF cavities to yield the desired wavelength give the undulator configuration. After processing by the undulator 130, the energy is sent to a separator 140, which separates the generated radiation and the electron beam, which may be recycled or dumped, as indicated by the electron dump 150. The generated radiation is provided to EUV optics 160, which then processes the radiation and provides radiation (FEL laser light) compatible with photolithography. The FEL laser may then be used to perform lithography processing upon semiconductor wafers. In many cases the distance from the electron gun 110 and the separator 140 may be approximately 100 meters.

The problems associated with the prior art includes the fact that in order for the FEL source 100 to be cost effective, it must generally power a plurality of scanners simultaneously. However, distribution of a multi-kW beam from one or more FEL sources 100 in a manner that the source is indistinguishable, is problematic and not readily achievable in the state of the art. For example, smaller wavelength light is very absorptive, therefore use of state of the art transmissive techniques, 45° angle of incidence (AOI), and exclusive use of near normal incidence multilayer mirror optics is negated by the designs purposeful generation of high power, high intensity beams or the design of the optical configuration itself.

Further, down-time caused by various factors, such as power problems, unpredictable emissions within the accelerator unit 120, stray electrons, neutrinos, etc., would cause the wafer processing operations to seize, resulting in huge downtime losses and costly process interruptions.

Still further, the real estate required to house the large state of the art FEL sources, bury the FEL sources 100, and place it outside the minimum distance from the fab is a substantial undertaking and costly. Moreover, use of one or more undulator/optical switchyard facilities are generally required to generate or direct a single FEL's output to power all lithography tools, thereby increasing the costs and complexity of operating the lithography tools. Such configuration also leads to an overall reduced utilization of all lithography scanners.

The present disclosure may address and/or at least reduce one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various methods, apparatus and system for providing an extreme ultraviolet beam for processing semiconductor wafers are disclosed. A level of the EUV beam is monitored. A determination is made as to whether the level of the EUV beam is below a predetermined level. In response to determining that the level of the EUV beam is below the predetermined level, a determination is made as to whether the output of at least one of the first or second laser devices has decreased from an initial level. The output of the at least one of the first or second laser devices is increased in response to determining that the output of at least one of the first or second laser devices has decreased from an initial level.

BRIEF DESCRIPTION OF THE DRAWINGS

The disclosure may be understood by reference to the following description taken in conjunction with the accompanying drawings, in which like reference numerals identify like elements, and in which.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein provide for utilizing multiple scanners with high wattage (e.g., 100's to 1000's of watts) substantially simultaneously from multiple substantially non-distinguishable light sources. Embodiments herein provide for substantially uninterrupted EUV source uptime from the integration of a FEL light source with a semiconductor fab for continued semiconductor processing operations. In some embodiments, two FEL sources may be each used at 50% capacity to provide the equivalent of an indistinguishable, single 100% FEL source. In this case, if a first FEL source starts to operate at below 50%, the output of the second FEL source may be increased to make up for the deficit of the first FEL source. This may provide a seamless maintenance of an equivalent 100% FEL source output.

Further, the need for an optical switchyard is obviated by having a shared optical configuration that may be implemented into the embodiments provided herein. Moreover, enabling the 50% operations of the multiple FEL source may reduce overall strain on various components (e.g., RF power supplies, undulators, superconducting RF accelerator cavities, electron injectors and cathodes, etc.). This may reduce the likelihood of faults and failures that could lead to costly processing downtime.

Further, embodiments herein may provide a collimated EUV source using two FEL sources configured in such a manner that a smaller footprint as compared to a linear configuration is provided. Utilizing this configuration, an accelerator facility design with a smaller footprint may be provided. Further, utilizing the redundancy provided by the dual FEL sources of embodiments herein, substantially uninterrupted processing, shared use of resources, such as a cryogenic plant, and other efficiencies may be realized.

Figure 3:
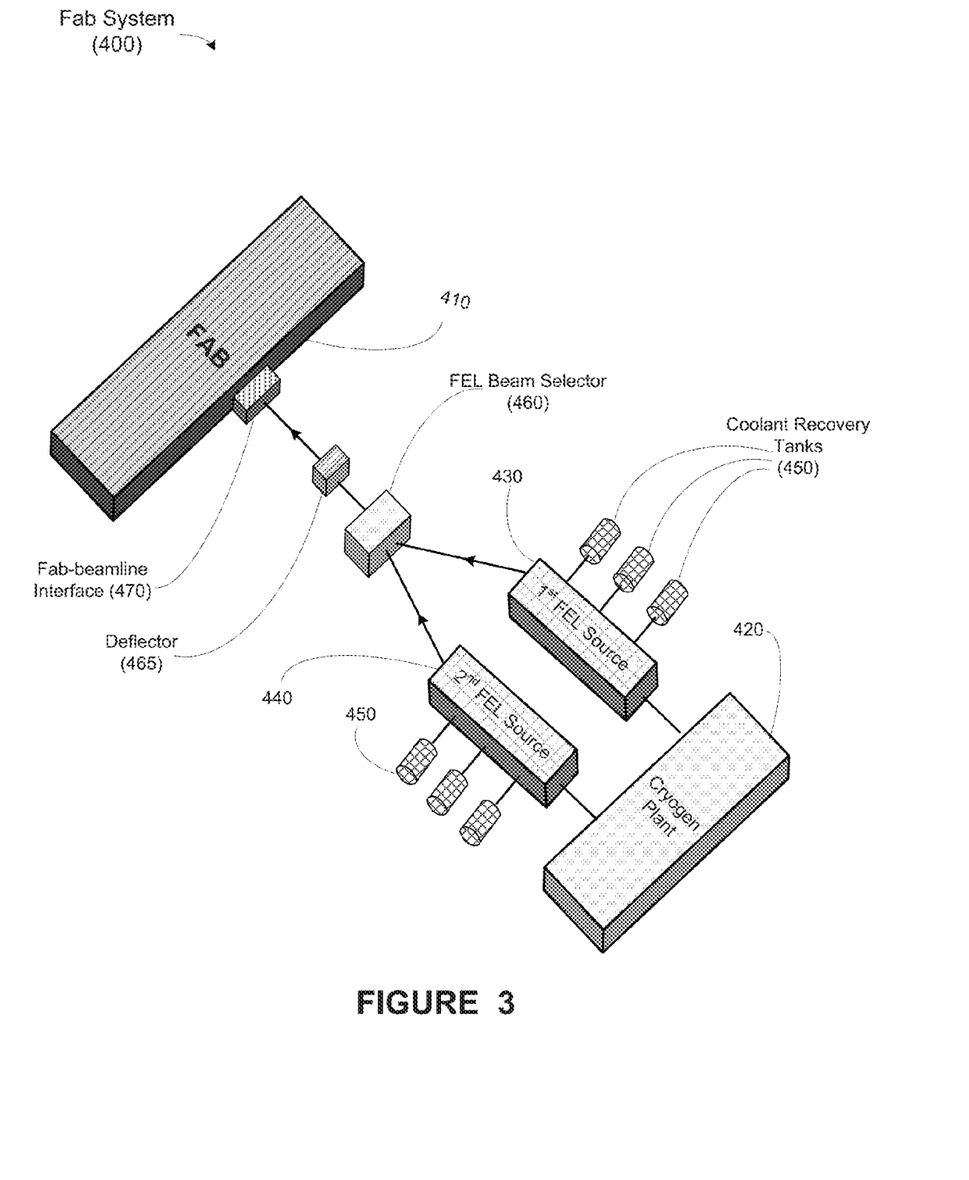
FIG. 3 illustrates a stylized depiction of a semiconductor fab system in accordance with a first embodiment herein.

Turning now to FIG. 3, a stylized depiction of a semiconductor fab system in accordance with a first embodiment herein, is illustrated. The fab system 400 of FIG. 4 comprises a fab 410 in which a plurality of processing steps (e.g., lithography process steps) may be performed. The system 400 may comprise a first FEL source 430 and a second FEL source 440. The FEL sources 430, 440 may provide high energy/power beams, EUV in the case of this disclosure, to a FEL beam selector 460, which may select one of the energy beams and provide a single EUV beam to the fab 410. The FEL sources 430, 440 and surrounding infrastructure (e.g., FEL beam selector 460) may be generally positioned below ground level for safety purposes.

During operations, the EUV beam is provided by only one the two FEL sources 430, 440. In the event that one of the FEL sources 430, 440 fails, the FEL beam selector 460 will selects the other FEL source in order to continue full operations of the fab 410. In this manner, power interruptions or other failures experienced by one of the FEL sources 430, 440 may be mitigated by the other FEL source. The EUV beam from the FEL selector 460 is provided to a vertical deflector 465, which routes the EUV beam upwards to the fab-beamline 470 interface, which provides the EUV beam to the fab 410. In some embodiments, the deflector 465 may comprise one or more reflectors. In other embodiments, the deflectors 465 may comprise an apparatus capable of providing energy fields that are capable of changing the direction of the energy beams.

The system 400 may also comprise a cryogen plant 420 to provide coolant (e.g., liquid nitrogen, helium, and/or the like) that may be shared by the FEL sources 430, 440. The system 400 may also comprise a plurality of emergency coolant recovery tanks 450 for recovering coolant material. The coolant recovery tanks 450 may be capable of recovering coolant materials such as liquid helium (He) or liquid nitrogen ($N_2$) in case of a quench of the superconducting components. Moreover, as described in further details below, the FEL sources 430, 440 may be configured in a folded-type manner to utilize less space compared to linear FEL configurations.

Figure 4:
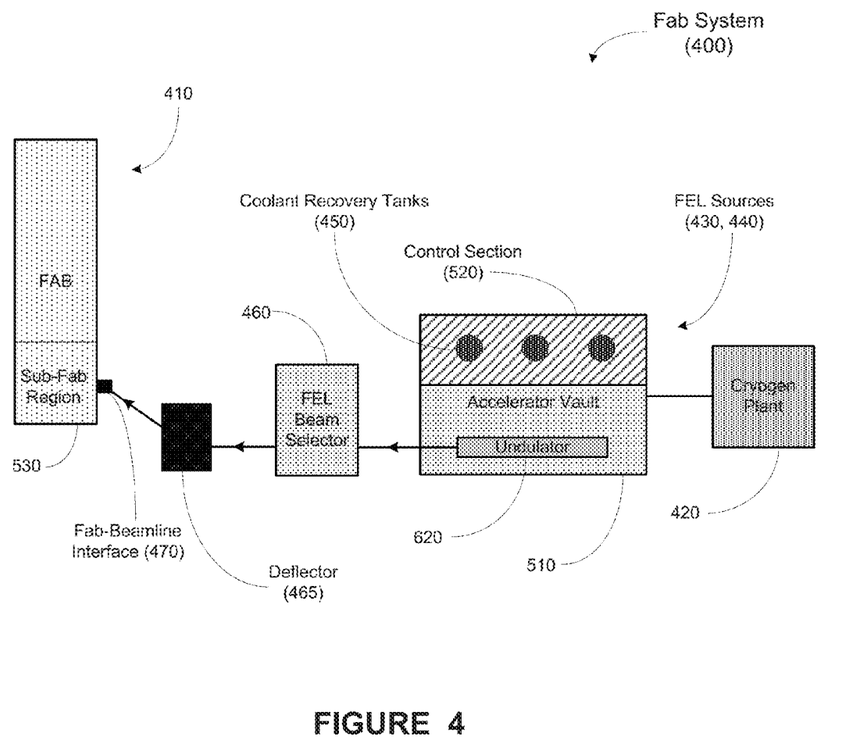
FIG. 4 illustrates a stylized depiction of a horizontal-view of the fab system of FIG. 4, in accordance with a first embodiment.

FIG. 4 illustrates a stylized depiction of a horizontal-view of the fab system 400 of FIG. 4, in accordance with a first embodiment. The FEL sources 430, 440 each comprises a radiation/accelerator vault 510 containing the FEL facilities (electron gun, SRF accelerator, undulator, etc.) required to generate the desired radiation (EUV light). The FEL sources 430, 440 may also comprise a control section 520, wherein the control section may comprise various control devices (e.g., a computer comprising control software) and support equipment (vacuum controllers, RF generators, power supplies, etc.) for operations of the accelerator of the FEL source 430, 440. The FEL sources 430, 440 each may also comprise of an undulator 620 within the accelerator vault 510 for providing a means which to oscillate the accelerated electrons, for providing radiated energy in the form a laser-like beam. In some embodiments, the FEL sources 430, 440 may also each comprise of an electron source, an electron/photon beam separator and an electron dump.

The cryogen plant 420 provides coolant (e.g., He, $N_2$, etc.) to the FEL sources 430, 440 to maintain proper temperatures during operations. The energy beams from the FEL sources 430, 440 are provided to the FEL beam selector 460, which selects one of the beams for forwarding to the fab 410. The output of the FEL beam selector, i.e., an EUV beam, is deflected upwards to a sub-fab region 530 of the fab 410. The sub-fab region 530 may comprise devices that are capable of distributing the EUV beam to a plurality of locations in the fab (e.g., to a plurality of lithography tools in the fab).

Figure 5:
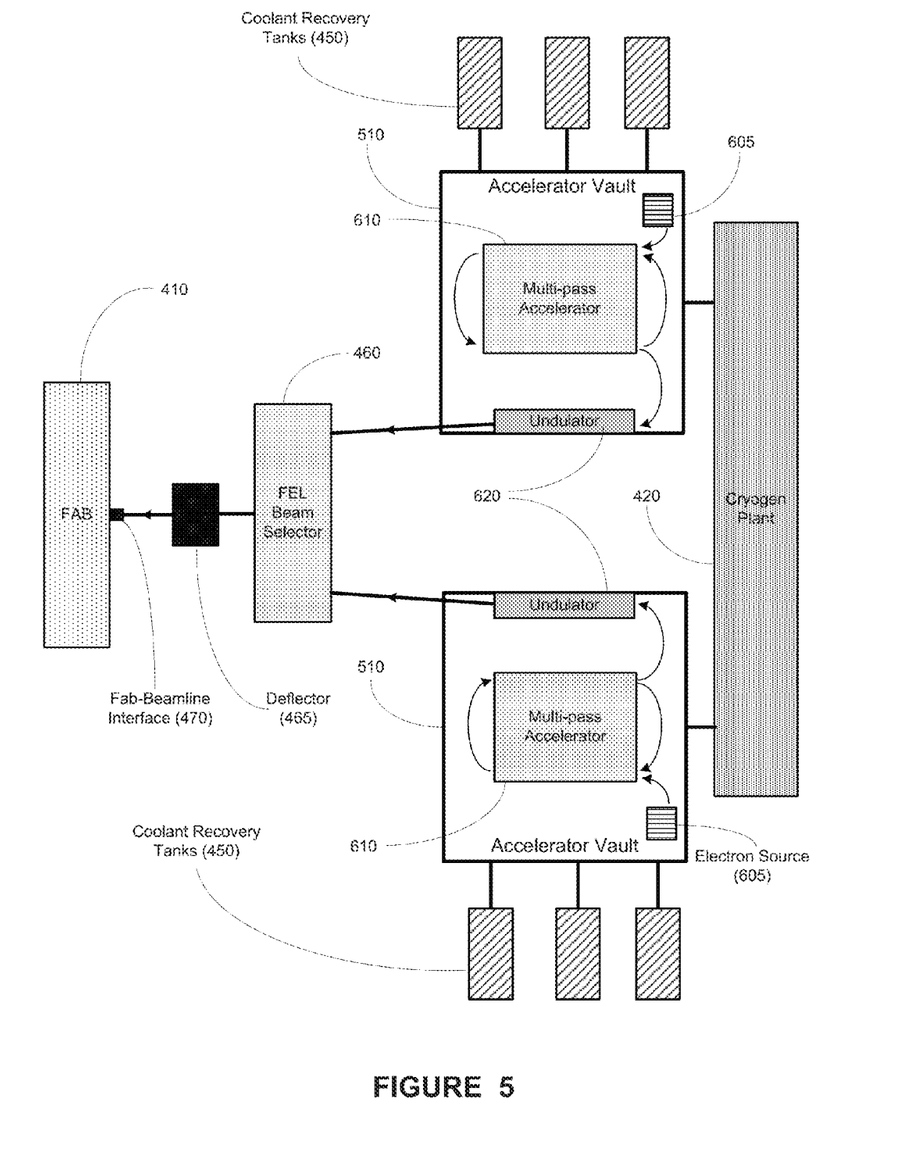
FIG. 5 illustrates a stylized depiction of a vertical-view of the fab system of FIG. 4, in accordance with a first embodiment.

FIG. 5 illustrates a stylized depiction of a vertical-view of the fab system 400 of FIG. 4, in accordance with a first embodiment. As depicted in FIG. 6, the accelerator vaults 510 of each of the FEL sources 430, 440 comprises a multi-pass accelerator 610 for accelerating electrons bunches provided by an electron source 605, as indicated by the curved arrow from the electron source 605 and the multi-pass accelerator 610. The multi-pass accelerator 610 may be a superconducting accelerator that is capable of accelerating the electron bunches to relativistic velocities. In some embodiments, the multi-pass accelerator 610 comprises a plurality of cryomodules through which the electrons are routed during the multi-pass of the electrons. The cryogen plant 420 is capable of provide sufficient cooling for the operation of the multi-pass accelerator 610 and its plurality of cryomodules. An undulator 620 may be positioned adjacent to the multi-pass accelerator 610 in a "folded" configuration along the most convenient axis (e.g., beside, above, below) as determined by the particular embodiments of the facility configuration. In the example of FIG. 5, the undulator 620 is located below multi-pass accelerator 610 in one example, and above in another example. In alternative embodiments, the FEL sources 430, 440 may be configured in a linear configuration, wherein the undulator 620 may be positioned in series to the FEL sources 430, 440, and wherein the FEL sources 430, 440 are linear, single-pass accelerators.

Electron paths (indicated by curved arrows) surrounding within multi-pass accelerator 610 may provide electron paths that are equivalent to standard linear path for an FEL source. The route of the electrons is configured to provide sufficient travel length while reducing the linear length required for operations of the FEL sources 430, 440 as well as ensuring the FEL energy beam from both FEL sources 430, 440 is emitted and directed in the same direction.

The undulators 620 provide energy beams (e.g., photon beams) to the FEL beam selector 460. The FEL beam selector 460 may comprise a plurality of reflective surfaces that may be used to switch from the first FEL source 430 to the second FEL source 440, and vice versa. The output (EUV beam) from the FEL selector 460 is provided to the vertical deflector 465, which routes the EUV beam to the fab-beamline interface 470, which provides the EUV beam to the fab 410. In one embodiment, the fab-beamline interface 470 may be positioned at a sub-fab region 530 (FIG. 4), from which the EUV beam may be distributed to various processing tools in the fab 410.

Figure 6:
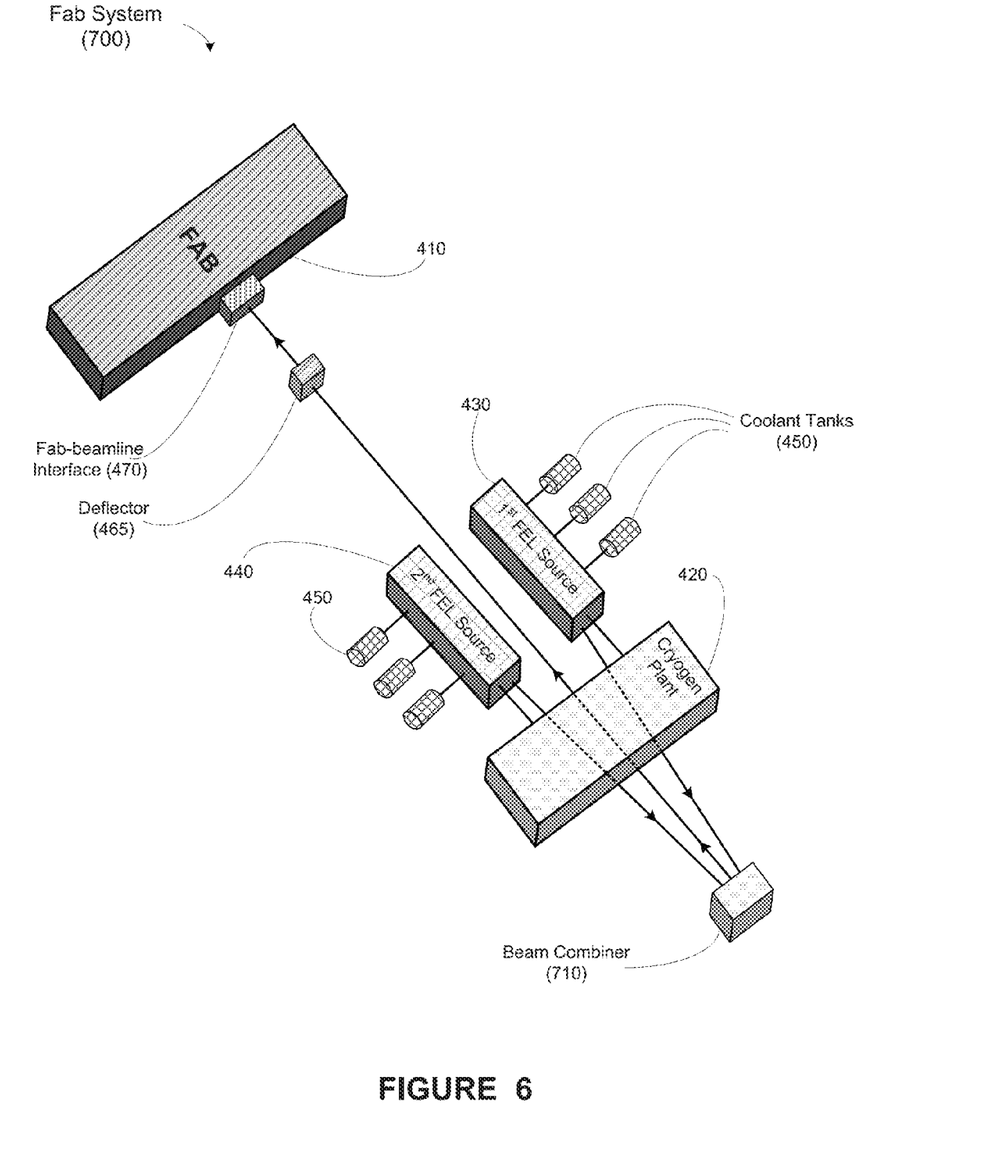
FIG. 6 illustrates a stylized depiction of another semiconductor fab system in accordance with a second embodiment herein, is illustrated.

Turning now to FIG. 6, a stylized depiction of a semiconductor fab system 700 in accordance with a second embodiment herein, is illustrated. Similar to the system 400 of FIG. 4, the system 700 may comprise a first FEL source 430 and a second FEL source 440 for providing energy beams. The system 700 also comprises a beam combiner 710, which is adapted to collimate the respective beams from the first and second FEL sources 430, 440 to provide a single EUV beam to the fab 410. The source of the collimated EUV beam is indistinguishable.

The system 700 may also comprise a cryogen plant 420 to provide coolant (e.g., liquid nitrogen, helium, and/or the like) that may be shared by the FEL sources 430, 440. The system 700 may also comprise a plurality of coolant recovery tanks 450 (e.g., emergency He/$N_2$ tanks) for recovering coolant material. The FEL sources 430, 440 may be configured in a folded-type manner to utilize less space compared to linear FEL laser configurations.

During operations, portions of the EUV beam are provided by both of the FEL sources 430, 440. In the event that one of the FEL sources 430, 440 fails or has a reduction in output, the system 700 may prompt the other FEL source to increase its capacity to compensate for the failure or reduction.

The EUV beam provided by the beam combiner 710 may comprise power that is equivalent to one of the FEL sources 430, 440 operating at 100%. Therefore, each of the FEL sources 430, 440 may operate at a capacity under 100% (e.g., 50% capacity each) wherein the collimation of the energy beams would provide an EUV beam at a power equivalent to 100% capacity of one of the FEL sources 430, 440. The collimated EUV beam may be provided to a vertical deflector 465 that comprises a reflective material positioned at such an angle that the EUV beam is provided upwards to the fab 410.

During operations, the EUV beam is provided by both the two FEL sources 430, 440, each operating at less than 100% capacity. Therefore, if the power capabilities of one of the FEL sources 430, 440 fall below 50% capacity, the capacity of the other FEL source may be increased to over 50% in order to make up for this deficit. In the event that one of the FEL sources 430, 440 fails, the capacity of the other FEL source may be increased to 100% output power in order to continue full operations of the fab 410. In this manner, power interruptions or other failures experienced by one of the FEL sources (e.g., 430) may be mitigated by the other FEL source (e.g., 440).

Figure 7:
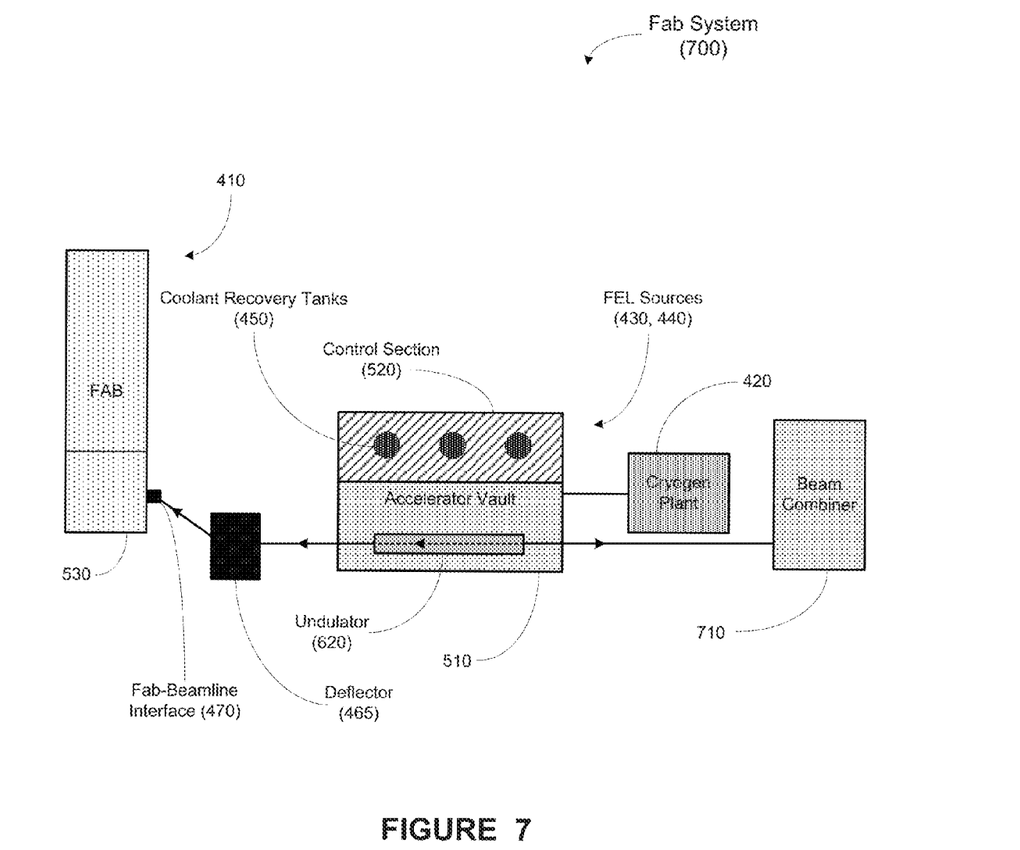
FIG. 7 illustrates a stylized depiction of a horizontal-view of the fab system of FIG. 7, in accordance with a second embodiment.

Turning now to FIG. 7, a stylized depiction of a horizontal-view of the fab system 700 of FIG. 6, in accordance with a second embodiment, is illustrated. The FEL sources 430, 440 each comprises an accelerator vault 510 for accelerating electrons to relativistic velocities. The cryogen plant 420 provides coolant to the FEL sources 430, 440 for maintaining proper temperatures during operations. The photon beams from the FEL sources 430, 440 are provided to the beam combiner 710, which combines the beams from the FEL sources 430, 440. This combined beam is then forwarded to the fab 410. As described above, once beams from the FEL sources 430, 440 are collimated, based upon the beam itself, the percentage of contribution from each of the sources 430, 440 are not known by the receiver of the combined beam.

Continuing referring to FIG. 7, in one embodiment, the beam combiner 710 is positioned farthest from the fab 410 to provide sufficient distance from the fab 410 while using less physical distance. As indicated in FIG. 7, the collimated EUV beam is directed from the beam combiner 710 to a vertical deflector 465, which deflects the EUV beam up to the sub-fab portion of the fab 410.

Figure 8:
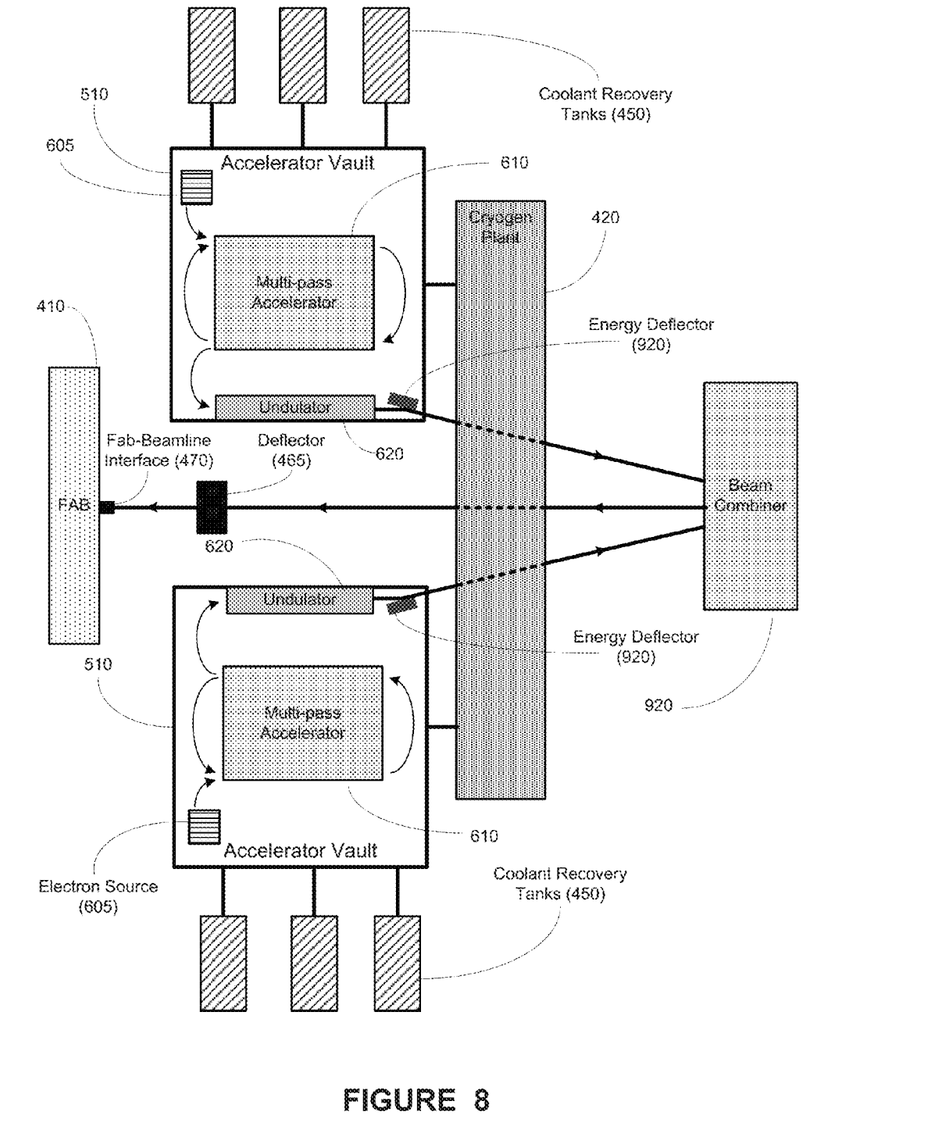
FIG. 8 illustrates a stylized depiction of a vertical-view of the fab system of FIG. 7, in accordance with a second embodiment.

Turning now to FIG. 8 a stylized depiction of a vertical-view of the fab system 400 of FIG. 4, in accordance with a second embodiment is illustrated. As depicted in FIG. 8, the accelerator vaults 510 of each of the FEL sources 430, 440 comprises an multi-pass accelerator 610 for accelerating electrons bunches provided by an electron source 605. The multi-pass accelerator 610 may be a superconducting accelerator that is capable of accelerating the electron bunches to relativistic velocities. In some embodiments, the multi-pass accelerator 610 may comprises a plurality of cryomodules through which the electrons are routed in its multi-pass journey, and on towards an undulator 620. The cryogen plant 420 is capable of providing sufficient cooling for the operations of the multi-pass accelerator 610. The undulator 620 may be positioned adjacent to the multi-pass accelerator 610 in a "folded" configuration along the most convenient axis (e.g., beside, above, or below) as determined by the embodiments of various facility configurations. In the example of FIG. 8, the undulator 620 is located below the multi-pass accelerator in one example, and above in another example. The route of the electrons is configured to provide sufficient travel length while reducing the linear length required for operation of the FEL sources 430, 440 as well as ensuring the FEL photon beam from both FEL sources 430, 440 is emitted and directed in the same direction. In alternative embodiments, the FEL sources 430, 440 may be configured in a linear configuration, wherein the undulator 620 may be positioned in series to the FEL sources 430, 440, and wherein the FEL sources 430, 440 are linear, single-pass accelerators.

Moreover, as indicated in FIG. 8, the energy beams from the undulators 620 are directed away from the fab to the beam combiner 710. The energy beams from each of the two undulators 620 are deflected by two respective energy deflectors 920, which guide the energy beam from each of the modulators 620 to the beam combiner 710, for combining the beams. The collimated EUV beam from the beam combiner 710 is then directed from the beam combiner 710 to the vertical deflector 465, which then directs the EUV beam to the fab-borderline interface 470. In some embodiments, the deflectors 465, 920 may comprise one or more reflectors. In other embodiments, the deflectors 465, 920 may comprise an apparatus capable of providing energy fields that are capable of changing the direction of the energy beams.

Figure 9:
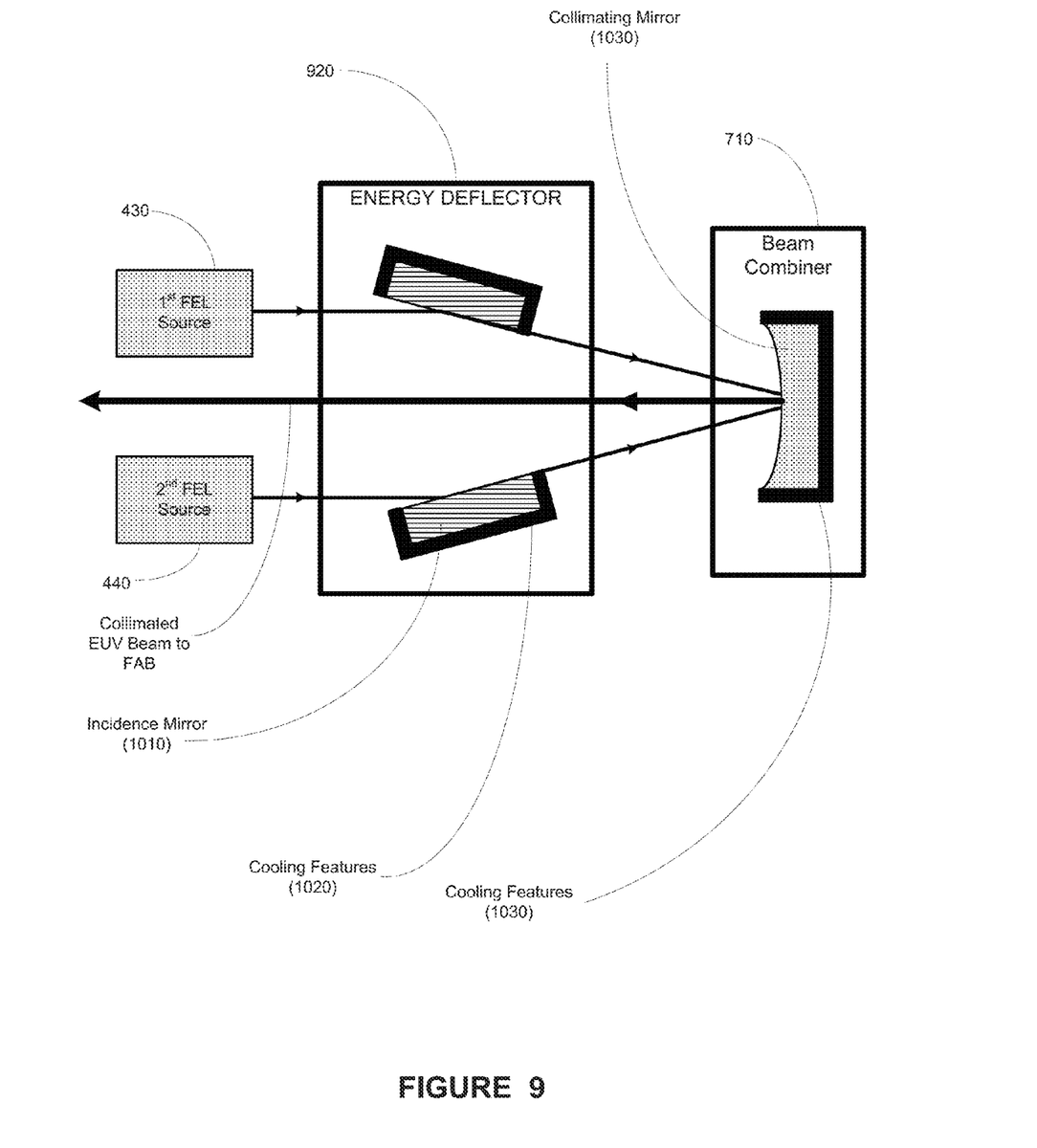
FIG. 9 illustrates a stylized depiction of the path of the separate energy beams from the FEL sources to the collimated beam combiner, in accordance with embodiments herein.

Turning now to FIG. 9, a stylized depiction of the path of the separate energy beams from the FEL sources to the collimated beam combiner, in accordance with embodiments herein is illustrated. Energy beams from each of the FEL sources 430, 430 are sent to the energy deflector 920. The energy deflector 920 may comprise a plurality of incidence mirrors 1010. In one embodiment, the incidence mirrors 1010 may be comprised of defocusing grazing incidence metal mirrors.

In one embodiment, the incidence mirrors 1010 are positioned at a relatively shallow angle (e.g., less than 45 degrees, but dependent on the mirror material and wavelength of light generated by the FEL sources 430, 440) and due to the grazing configuration of the mirrors 1010, heat may be dispersed over a larger area, assisting in cooling the energy deflector 920. Mirror cooling features 1020 may be configured in a encompassing fashion around the incidence mirrors 1010 for maintaining operational temperatures as to reduce over-heating of the energy deflector 920.

The energy deflector 920 guides the energy beams from the FEL sources 430, 440 to the beam combiner 710. The beam combiner 710 may comprise a collimating mirror 1040 for collimating the multiple energy beams from the energy deflector 920. In one embodiment, the collimating mirror 1040 may comprise a concave reflective feature, configured to collimate a plurality of energy beams. The reflective feature of the collimating mirror 1040 may be comprised of a metallic material or a substrate coated with a plurality of alternating materials (e.g., Mo/Si multi-layered mirror capable of near-normal incidence reflection) optimized for the wavelength of radiation being generated by the FEL sources 430, 440. The collimating mirror 1040 is configured to combine a plurality of beams in such a manner that the received energy is combined into a single energy beam, wherein the individual energy components that were combined are no longer distinguishable. A cooling feature 1030 may be configured about the collimating mirror 1040 in order to maintain proper operating temperatures of the beam combiner 710. The output of the beam combiner is then provided to fab 410 via the vertical deflector 465 located between the fab 410 and the beam combiner 920.

Figure 10:
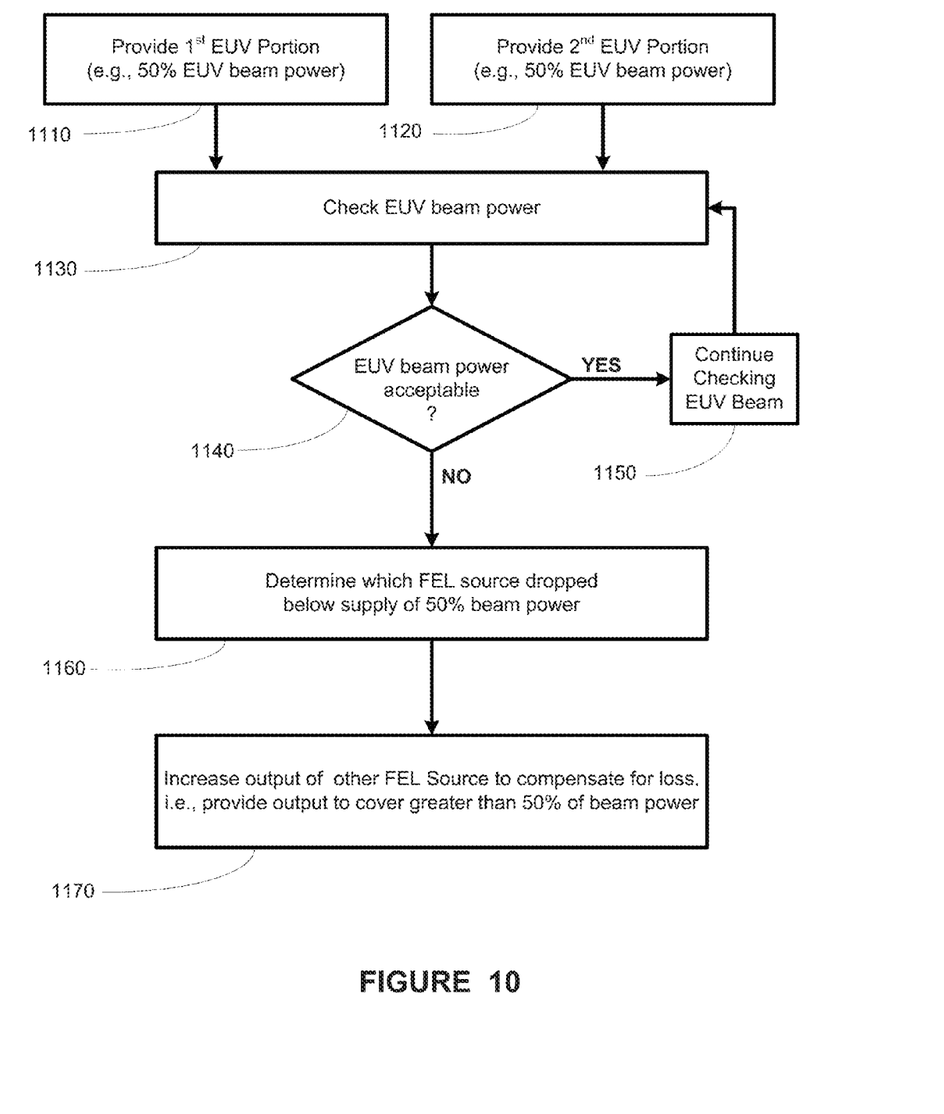
FIG. 10 illustrates a flowchart depiction of a method for providing an EUV beam, in accordance with embodiments herein.

Turning now to FIG. 10, a flowchart depiction of a method for providing an EUV beam, in accordance with embodiments herein is illustrated. A first EUV portion may be provided by a first FEL source (block 1110). In one embodiment, the first EUV portion may be less than a EUV beam at full (100%) power (e.g., 50% power) as utilized by a semiconductor processing fab. Simultaneously, a $2^{nd}$ EUV portion may also be provided by a second FEL source (block 1120). In one embodiment, the second EUV portion also may be less than a EUV beam at full (100%) power (e.g., 50% power) as utilized by a semiconductor processing fab.

The total power of the EUV beam being received by the fab may be checked (block 1130). This check may involve determining whether the overall power of the EUV beam is at a predetermined power level (e.g. 100% power output of on FEL source). This check may be made periodically at predetermined intervals, upon detection of one or more fab parameters that indicative of a process change, upon detection of a power reduction, upon reception of a message from the source of the beam, or other indications that would be known to those skilled in the art having benefit of the present disclosure.

A determination may then be made as to whether the EUV power is sufficient for proper operations within the fab (block 1140). Upon detecting that the EUV power is sufficient for proper operations within the fab, the EUV power may be checked again at the next predetermined interval (block 1150). Upon detecting that the EUV power is not sufficient for proper operations within the fab, a determination may be made as to which FEL source has dropped its output power (block 1160). For example, a determination is made as to whether it was the first FEL source or the second FEL source that dropped its output beam power below 50%. Upon this determination, the output power of the FEL source that did not drop its output power is increased sufficiently to compensate for the detected beam power loss (block 1170). For example, if the output beam power of the first FEL is reduced to 40%, the output power of the second FEL source may be increased to compensate for the reduction, thereby providing an EUV beam at 100% output power for full fab operations. Upon performing this adjustment, the EUV power may be periodically checked to make further adjustments. In one embodiment, in the event a power compensation process is implemented, the frequency of the EUV power checks may be increased until normal EUV power output by all FEL sources are resumed. The frequency of checking the EUV power output by the FELs may be adjusted to such a point that any fluctuation in power capable of affecting manufacturing operations is substantially avoided as would be known to those skilled in the art benefiting from the present disclosure.

Figure 11:
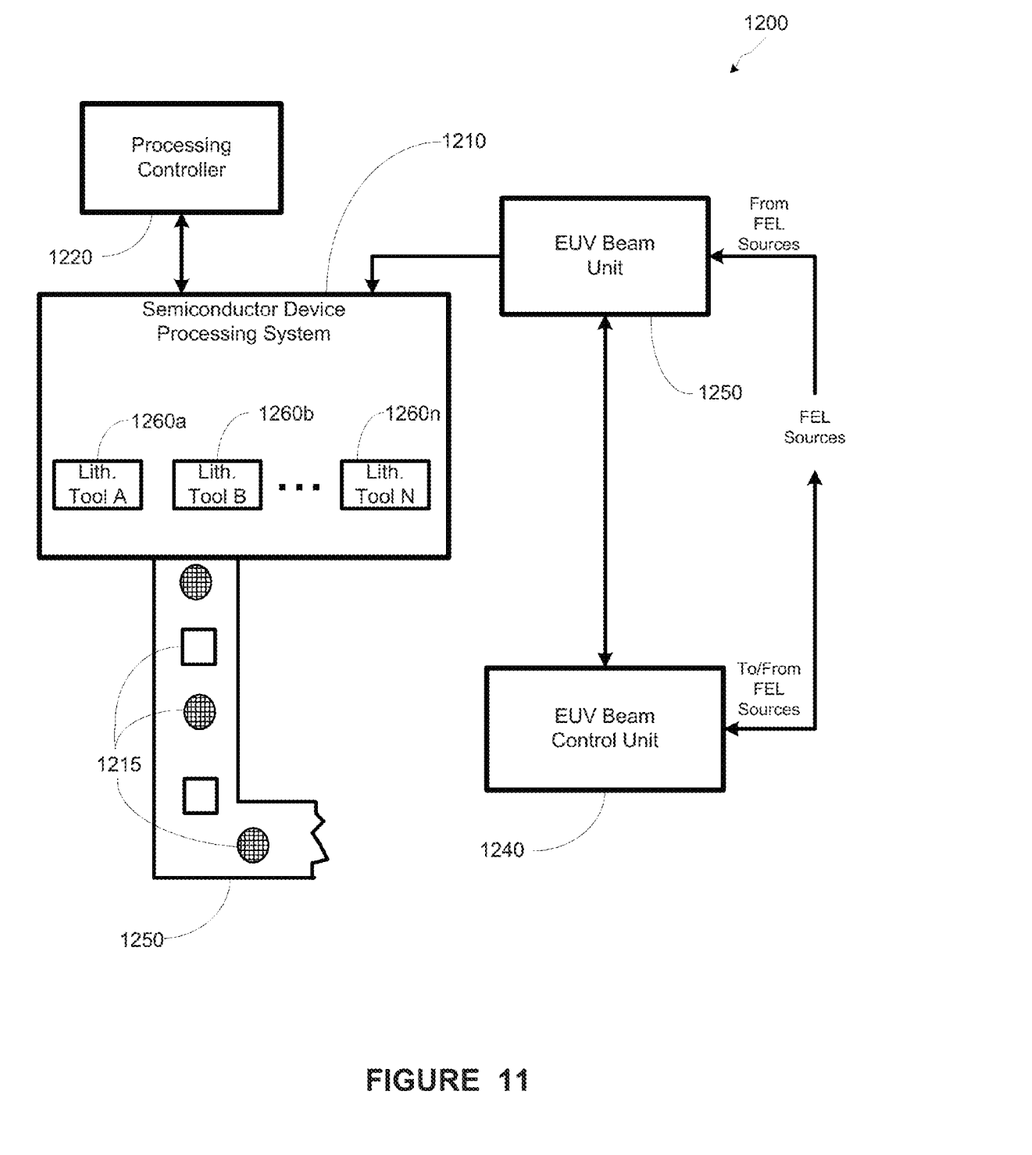
FIG. 11 illustrates a stylized depiction of a fab system for providing an EUV beam for performing process of semiconductor wafers, in accordance with embodiments herein.

Turning now to FIG. 11, a stylized depiction of a system for providing an EUV beam for processing semiconductor wafers, in accordance with embodiments herein, is illustrated. The semiconductor device processing system 1210 may manufacture integrated circuit devices by processing semiconductor wafers. The semiconductor device processing system 1210 may comprise various processing stations, such as etch process stations, photolithography process stations, CMP process stations, etc.

The processing system 1210 of FIG. 12 may comprise a plurality of lithography tools (1260a-1260n) that use EUV beams to perform lithography processing of semiconductor wafers. The system 1200 may comprise an EUV beam unit 1250 that is capable of providing one or more EUV beams for use by various lithography tools 1260a-1260n in the processing system 1210. The EUV beam unit 1240 is capable of dividing and distributing the EUV beams to the lithography tools 1260a-1260n. The EUV beam unit 1250 may receive an EUV beam from an FEL system, as exemplified above with regard to FIGS. 4 and 7. The EUV beam control unit 1250 is capable of controlling the operations of the EUV beam unit 1250. For example, the switching of the EUV beam for distribution to various locations in the processing system 1200 may be controlled by the EUV beam control unit 1240. Further, the EUV beam control unit 1240 may receive data indicative of the operations of an FEL system and make adjustments to the usage of the EUV beams as a result. For example, if significant power loss occurs by the FEL sources, the EUV beam control unit 1240 may direct a reduction in lithography processing until the power loss issue is sufficiently mitigated.

One or more of the processing steps performed by the processing system 1210 may be controlled by the processing controller 1220. The processing controller 1220 may be a workstation computer, a desktop computer, a laptop computer, a tablet computer, or any other type of computing device comprising one or more software products that are capable of controlling processes, receiving process feedback, receiving test results data, performing learning cycle adjustments, performing process adjustments, etc.

The semiconductor device processing system 1210 may produce integrated circuits on a medium, such as silicon wafers. The production of integrated circuits by the device processing system 1210 may be based upon the circuit designs provided to the processing controller 1220. The processing system 1210 may provide processed integrated circuits/devices 1215 on a transport mechanism 1250, such as a conveyor system. In some embodiments, the conveyor system may be sophisticated clean room transport systems that are capable of transporting semiconductor wafers. In one embodiment, the semiconductor device processing system 1210 may comprise a plurality of processing steps, e.g., the $1^{st}$ process step, the $2^{nd}$ process set, etc., as described above.

In some embodiments, the items labeled "1215" may represent individual wafers, and in other embodiments, the items 1215 may represent a group of semiconductor wafers, e.g., a "lot" of semiconductor wafers. The integrated circuit or device 1215 may be a transistor, a capacitor, a resistor, a memory cell, a processor, and/or the like. In one embodiment, the device 1215 is a transistor and the dielectric layer is a gate insulation layer for the transistor.

The system 1200 may be capable of performing analysis and manufacturing of various products involving various technologies. For example, the system 1200 may design and production data for manufacturing devices of CMOS technology, Flash technology, BiCMOS technology, power devices, memory devices (e.g., DRAM devices), NAND memory devices, and/or various other semiconductor technologies.

The system 1200 may be capable of manufacturing and testing various products that include transistors with active and inactive gates involving various technologies. For example, the system 1000 may provide for manufacturing and testing products relating to CMOS technology, Flash technology, BiCMOS technology, power devices, memory devices (e.g., DRAM devices), NAND memory devices, and/or various other semiconductor technologies.

The methods described above may be governed by instructions that are stored in a non-transitory computer readable storage medium and that are executed by, e.g., a processor in a computing device. Each of the operations described herein (e.g., FIGS. 10 and 11) may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

generating a first laser portion from a first free electron laser (FEL) source, wherein generating said first laser portion comprises accelerating a first electron bunch in a first superconducting accelerator configured to direct the first electron bunch in a rotational path within said superconducting accelerator and into a first undulator configured in parallel to said accelerator;

generating a second laser portion from a second FEL source, wherein generating said second laser portion comprises accelerating a second electron bunch in a second superconducting accelerator configured to direct the second electron bunch in a counter-rotational path with respect to the first laser portion within said second laser portion superconducting accelerator and into a second undulator configured in parallel to said accelerator;

combining said first laser portion and said second laser portion to generate an extreme ultraviolet (EUV) beam; and providing said EUV beam to a plurality of processing tools.

2. The method of claim 1, further comprising:

monitoring a level of said EUV beam;

determining whether said level of said EUV beam is below a predetermined level;

determining, in response to determining that said level of said EUV beam is below said predetermined level, whether the output of at least one of said first or second laser devices has decreased from an initial level; and increasing the output of said at least one of said first or second FEL sources in response to determining that said output of at least one of said first or second FEL sources has decreased from an initial level.

3. The method of claim 1, wherein providing the first laser portion using the first FEL source comprises providing 50% of the energy of said EUV beam; and providing the second laser portion using the second FEL source comprises providing 50% of the energy of said EUV beam.

4. The method of claim 1, wherein combining said first laser portion and said second laser portion comprises combining said first and second laser portions using a laser collimating device to collimate said first and second laser portions into said EUV beam.

5. The method of claim 1, wherein combining said first laser portion and said second laser portion comprises providing the outputs from said first and second undulators into a collimating device for collimating the outputs from said first and second undulators to generate said EUV beam.

6. The method of claim 1, further comprising providing said EUV beam to a fab-beamline interface for providing said EUV beam to said plurality of processing tools.

7. The method of claim 1, wherein combining said first laser portion and said second laser portion comprises switching between said first laser portion and said second laser portion to provide said EUV beam.

\* \* \* \* \*